United States Patent [19]

Duke et al.

[11] 4,038,644
[45] July 26, 1977

[54] DESTINATION SELECTION APPARATUS FOR A BUS ORIENTED COMPUTER SYSTEM

[75] Inventors: Jack R. Duke, Escondido; Philip W. Brooks, Lakeside; Robert R. Elzer, Escondido, all of Calif.

[73] Assignee: NCR Corporation, Dayton, Ohio

[21] Appl. No.: 633,345

[22] Filed: Nov. 19, 1975

[51] Int. Cl.$^2$ .......................... G06F 3/04; G06F 9/18
[52] U.S. Cl. .................................................. 364/900
[58] Field of Search ...................... 340/172.5; 445/1

[56] References Cited

U.S. PATENT DOCUMENTS

| | | | |
|---|---|---|---|
| 3,242,467 | 3/1966 | Lamy | 340/172.5 |
| 3,253,262 | 5/1966 | Wilenitz et al. | 340/172.5 |
| 3,286,240 | 11/1966 | Thompson et al. | 340/172.5 |
| 3,323,109 | 5/1967 | Hecht et al. | 340/172.5 |
| 3,445,822 | 5/1969 | Driscoll | 340/172.5 |
| 3,470,542 | 9/1969 | Trantanella | 340/172.5 X |
| 3,710,324 | 1/1973 | Cohen et al. | 340/172.5 |
| 3,934,230 | 1/1976 | Salle et al. | 340/172.5 |
| 3,940,743 | 2/1976 | Fitzgerald | 340/172.5 |

*Primary Examiner*—Melvin B. Chapnick
*Attorney, Agent, or Firm*—J. T. Cavender; Edward Dugas

[57] ABSTRACT

In order to carry out data transfer among the subsystems of a bus oriented data processing system, each subsystem is coupled to the bus by a local bus adapter which controls both source and destination aspects of the information transfer. Each local bus adapter has a unique "busy" line which may be interrogated by any local bus adapter connected to the bus. When a source subsystem wishes to transfer information to a destination subsystem, the source local bus adapter determines from the destination local bus adapter's busy line whether or not the destination subsystem is available to accept the information. If the destination subsystem is available, the source local bus adapter requests access to the bus from priority resolution apparatus. When the source request is granted, the source local bus adapter issues the message to the bus and also sets the destination local bus adapter's busy line to designate the busy state which indicates to the destination bus adapter that it must prepare to receive a message and also indicates to all subsequently requesting local bus adapters that the particular subsystem to which information just placed on the bus is to be transferred is temporarily not available to receive information from any other local bus adapter. When the message has been received by the destination local bus adapter, both the source and destination local bus adapters enter a status cycle to check the integrity of the transmitted message. If the message is received intact, both the source and destination local bus adapters complete their individual housekeeping tasks during which the destination local bus adapter turns off its busy line. If an error has occurred during the message transmission, the destination subsystem, after the transfer has been retried once, disregards the message and turns off its busy line.

8 Claims, 10 Drawing Figures

DESTINATION SELECTION APPARATUS FOR A BUS ORIENTED COMPUTER SYSTEM

FIELD OF THE INVENTION

This invention relates to the data processing arts and, more particularly, to the art of information transfer among the subsystems of a bus oriented information data processing system.

BACKGROUND OF THE INVENTION

Among the recognized architectures for data processing systems is the well known bus oriented system in which the various subsystems communicate with one another through a common bus. In bus oriented systems, it is necessary for a source subsystem to ascertain the availability of and obtain the attention of the destination subsystem. In the prior art, this function has typically been carried out using the so-called "broadcast" technique in which the source subsystem places the address of the destination subsystem on address lines constituting a section of the common bus. The destination subsystem must respond with a "handshake" message indicating its status and availability. After analyzing the handshake message, the source subsystem may then proceed to request access to the bus for the purpose of transmitting the message. The broadcast technique, of course, has many variants, but the common thread among them is the necessity for the issuance of a preliminary inquiry from the source to the destination and a definite response from the destination to the source before actual information transfer can commence.

Those skilled in the art will appreciate that an increase in system speed could be obtained if the necessity for the preliminary addressing and acknowledgment dialog between source and destination subsystems could be eliminated.

OBJECTS OF THE INVENTION

It is therefore a broad object of our invention to provide an improved means for selecting a destination subsystem by a source subsystem to effect information transfer in a data processing subsystem.

It is another object of our invention to provide such means which is simple and completely reliable in operation.

It is yet another object of our invention to provide such means by which the selection function is carried out extremely quickly and reliably.

In a more specific aspect, it is an object of our invention to provide means by which a fundamental subsystem status, busy or not busy, is available to, and controllable by, the local bus adapters of all the other subsystems in the system.

It is a still further object of our invention to provide means by which a destination subsystem can respond to action taken at a source local bus adapter to prepare to receive a valid message from the source subsystem.

BRIEF DESCRIPTION OF THE INVENTION

Briefly, these and other objects of the invention are achieved by providing a local bus adapter disposed between a bus oriented data processing system's internal transfer bus and each subsystem. Each local bus adapter has a busy line, and all busy lines are available in each local bus adapter. Further, every busy line can be set to indicate a busy state by any local bus adapter. When one subsystem wishes to communicate with another subsystem, a request is issued to the source subsystem's local bus adapter along with the identification of the prospective destination subsystem. The source local bus adapter internally interrogates the busy line of the prospective destination subsystem, and if the destination subsystem is not busy, the source local bus adapter issues a request for access to the bus to bus control circuitry. If the source subsystem is the highest priority subsystem currently making a request for the bus, the request is granted. In response, the source local bus adapter sets the busy line of the destination local bus adapter to the busy state which indicates to the destination local bus adapter that it must prepare to receive a message off the bus and also indicates to all other prospective source subsystems that the selected destination subsystem is temporarily unavailable to them. After the message is transmitted, both the source and destination local bus adapters enter a status cycle to check the integrity of the transmitted message. Thereafter, the destination subsystem resets its own busy line and once again becomes available to accept a subsequent message from any local bus adapter which may be able to set its busy line.

The subject matter of the invention is particularly pointed out and distinctly claimed in the concluding portion of the specification. The invention, however, both as to organization and method of operation, may best be understood by reference to the following description taken in connection with the subjoined claims and the accompanying drawings of which:

DETAILED DESCRIPTION OF THE APPARATUS

The logic diagrams are presented in slightly simplified form in order that the inventive concept may be more readily understood. For example, instantaneous response times are assumed such that no special circuitry is shown for overcoming logic race conditions which may occur as the speed of operation is increased until the circuits cannot be assumed to respond immediately. The changes and additions required to overcome logic race conditions and other problems associated with extremely high speed operation are known to all skilled in the art and are of no consequence to an understanding of the invention. To further clarify the inventive concepts, the logic is presented using the most basic types of AND-gates, OR-gates, flip-flops, etc. It is apparent that the inventive concepts can be realized and practiced utilizing the more complex types of logic elements which are now generally incorporated into contemporary data processing systems because of the availability and general use of integrated circuits directly realizing such complex logic elements. Further, the operation of the apparatus is presented in a strictly sequential form. Of course, conventional timing practice in data processing apparatus utilizes, to the fullest extent possible, overlapping and simultaneous logic operations to increase overall speed. It is believed that the invention would be obscured by the inclusion of all the logic in its most complex form of the exact machine embodiment in which the invention is currently practiced.

Figure 1:
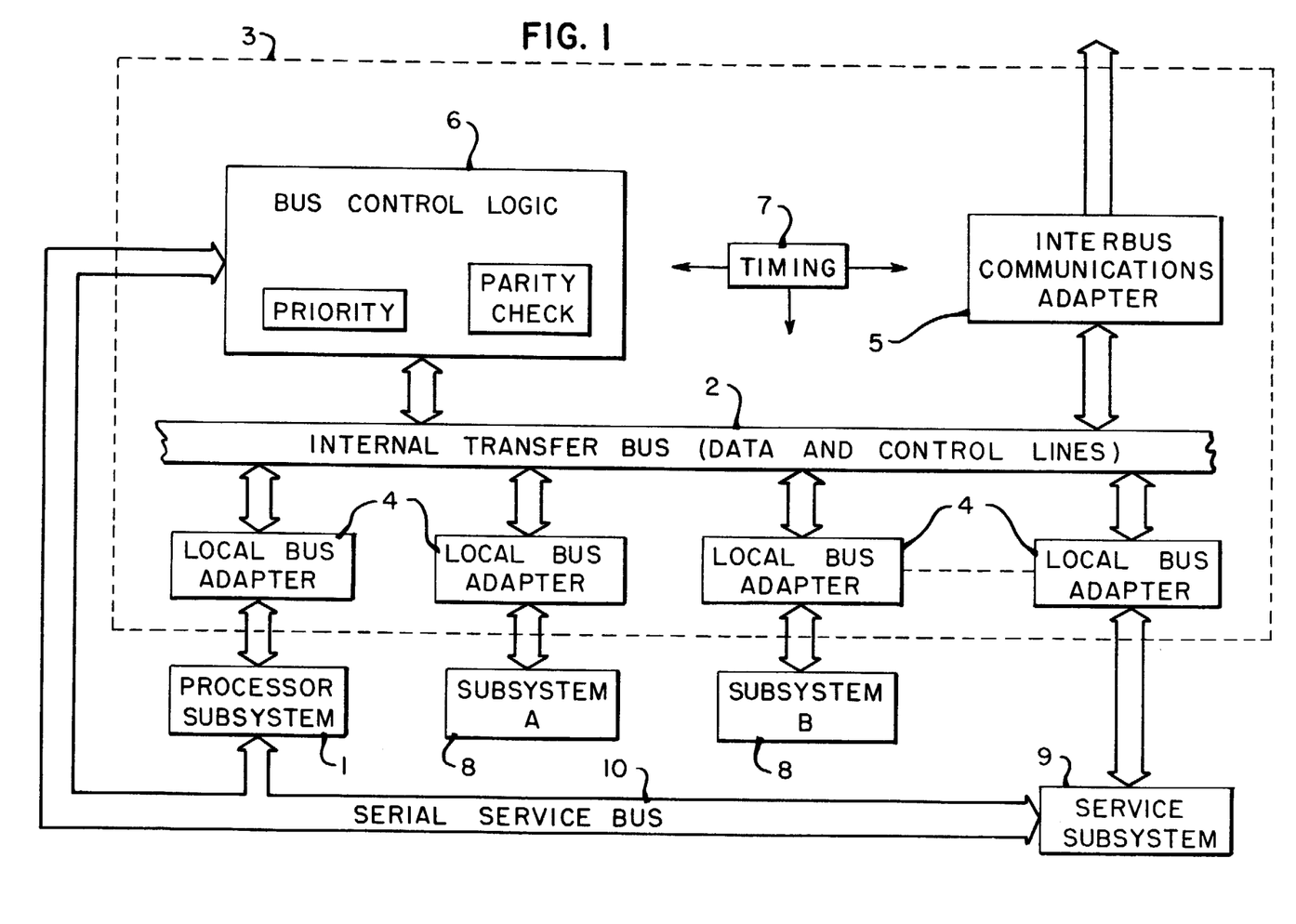
FIG. 1 is a major block diagram of a bus oriented data processing system comprising an exemplary environment in which our invention finds use.

Attention is now directed to FIG. 1 which illustrates in a block diagram, an exemplary data processing system in which the present invention finds use. The data processing system of FIG. 1 is bus oriented in that all the subsystems, including the processor subsystem 1, are coupled to one another by means of an internal transfer bus 2. The internal transfer bus is incorporated into an internal transfer bus subsystem 3 which also includes a plurality of local bus adapters 4, an interbus communication adapter 5, bus control logic 6, and timing logic 7. In the internal transfer subsystem to be described, up to 16 local bus adapters and interbus communication adapters may be coupled to the internal transfer bus 2. Typically, only one interbus communication adapter 5 is provided. Undesignated subsystems 8 may constitute any of the subsystems data processors usually found in a bus-oriented data processing system; e.g.: core memory, tape units, disk units, printers, video displays, etc. The service subsystem 9 may include a system console to effect two-way communication between an operator and the data processing system.

The function of the internal transfer bus 2 is to transmit information from one local bus adapter to another local bus adapter. It defines the paths and procedures to be used by the local bus adapters to communicate with each other. All information is passed over the internal transfer bus sequentially following the common procedure defined by the internal transfer bus protocol. The identical local bus adapters 4 interface every subsystem to the internal transfer bus. Each local bus adapter performs all the logic operations necessary to insure that the internal transfer bus discipline is maintained at all times.

The bus control logic 6 performs several functions. Of most direct interest to the present invention, it arbitrates all local bus adapter requests to use the internal transfer bus. This is accomplished on a fixed priority basis in the exemplary embodiment. Each local bus adapter is assigned a specific priority, and in case of simultaneous requests, the bus control honors the local bus adapter having the highest priority. The bus control logic also checks the parity of all messages sent over the internal transfer bus and reflects the result of the parity check onto the internal transfer bus for analysis by the communicating local bus adapters. The bus control logic can communicate with the service subsystems 9 and the processor subsystem 1 by means of the serial service bus 10 in order to provide certain system condition history and status information and signals of no direct consequence to the present invention.

The internal transfer subsystem is a synchronous logic machine in that all operations in the internal transfer subsystem are synchronized with clock and phase signals emanating from the timing logic 7.

Figure 2A:
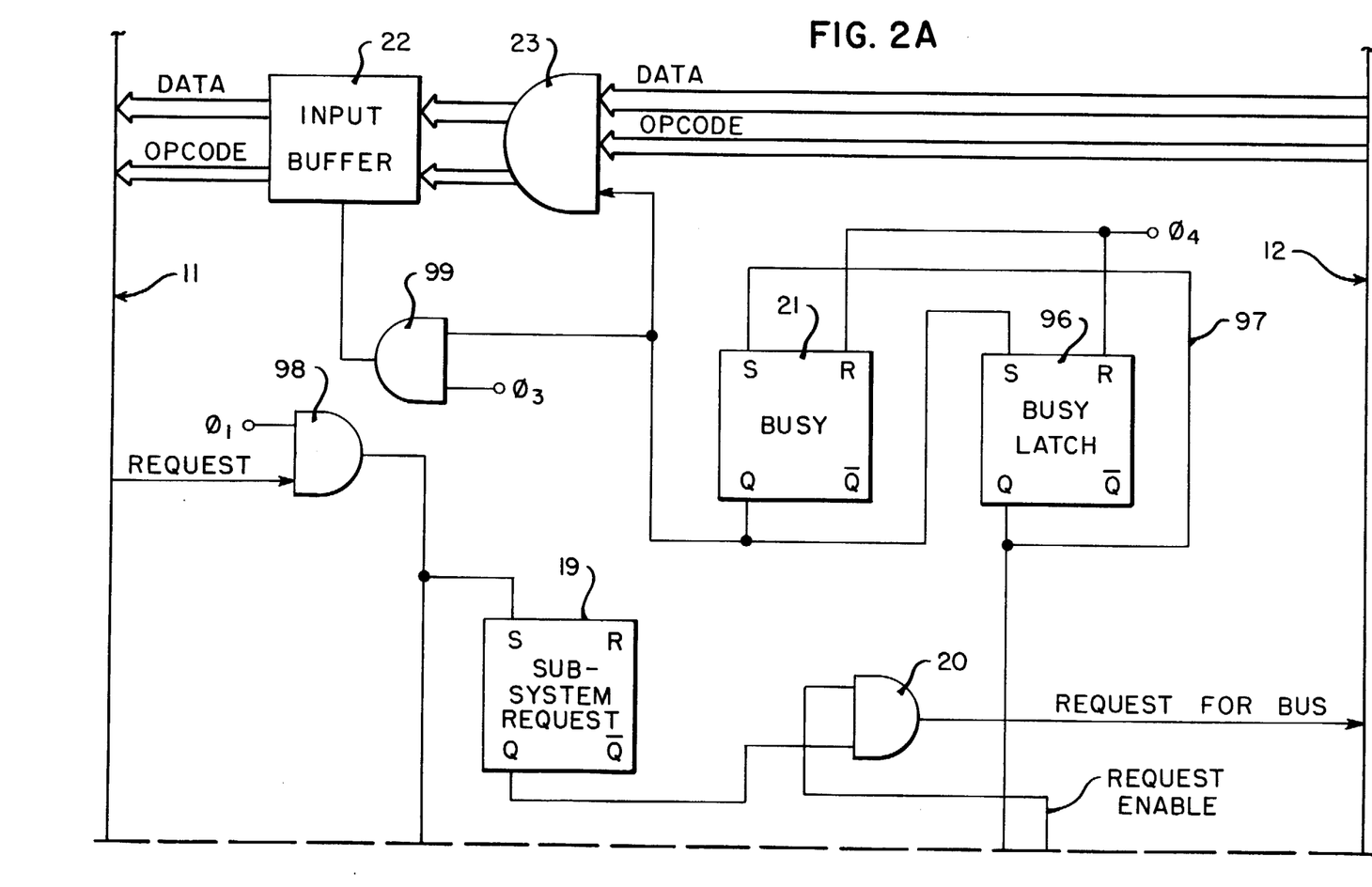
FIGS. 2A and 2B, taken together, are a logic block diagram of a local bus adapter module from the system of FIG. 1.
Figure 2B:
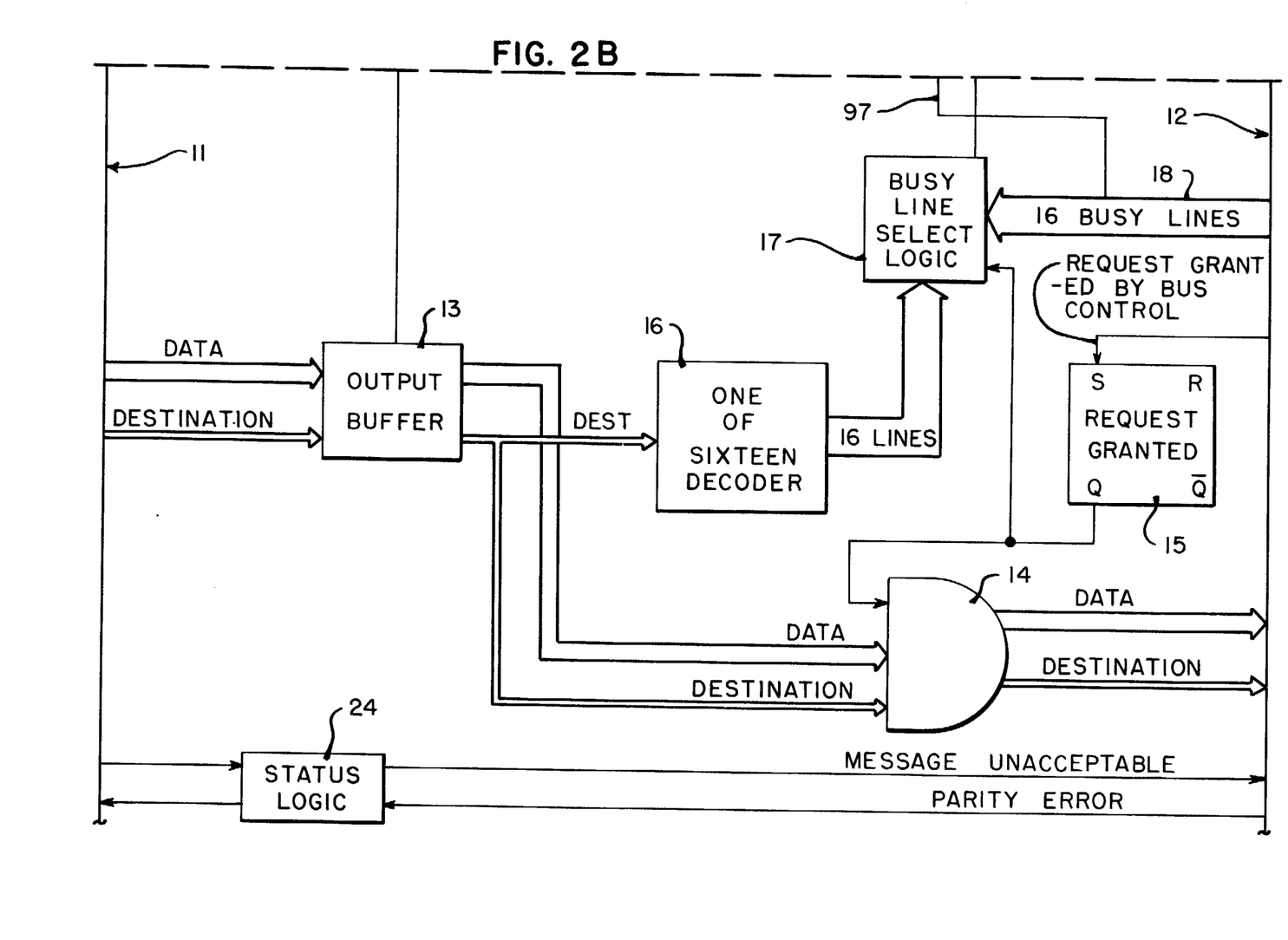

Referring now to FIGS. 2A and 2B, the apparatus comprising an exemplary local bus adapter will be discussed. The local bus adapter is disposed between a subsystem interface 11 and an internal transfer bus interface 12. The local bus adapter receives request, data, destination, and status information from its associated subsystem at the interface 11. Those skilled in the art will appreciate that such information is routinely available from typical subsystems used in bus oriented data processing systems. The local bus adapter receives data, opcode, busy line, request-granted, and parity error information from the bus interface 12. The data and opcode information is selectively passed on to the subsystem. Similarly, the data and destination information received from the subsystem is selectively issued to the bus interface 12. In addition, the local bus adapter can issue a Request signal to the bus and also can affect the status of any one of the busy lines brought into the local bus adapter.

Data and destination information from the subsystem interface 11 is applied to an output buffer 13 and clocked into the buffer when the Subsystem Request flip-flop 19 is set. This same data and destination information is taken from the output buffer and applied to an output AND-gate array 14. Transfer of this information through the output AND-gate array 14 is controlled by the state of a Request Granted flip-flop 15 which has its Q output connected to each of the gates in the array. The destination code from the output buffer 13, which in the exemplary embodiment constitutes a 4 bit code designating ports 0000 through 1111 (i.e., 0 through 15), is applied to a one-of-sixteen decoder 16. One-of-sixteen decoder 16, which is described in detail below, issues an enabling signal from a single one of its sixteen outputs according to the binary configuration of the input destination code. The sixteen output lines from one-of-sixteen decoder 16 are applied to busy line selection logic 17 which also receives an input from the Q output of the Request Granted flip-flop 15. The busy lines 18 of all the subsystems in the system are also available for monitoring by the busy line selection logic 17. The busy line selection logic 17, which will be described in detail below, also includes means for selectively forcing any one of the busy lines 18 to the busy state.

A Request signal received from the subsystem interface 11 passes through a time controlled AND-gate 98 and is used to set the Request flip-flop 19. The Q output from the Request flip-flop 19 is applied as one input to an AND-gate 20, and, as previously noted, to the in-clock input to the output buffer 13. The other input to the AND-gate 20, which serves to issue a priority request signal from the local bus adapter to the bus interface 12, is received from the busy line selection logic 17.

Information received from the bus interface 12 is gated to an input buffer 22 through an input AND-gate array 23 when a Busy flip-flop 21 is in the set state because the Q output therefrom is coupled to enable the gates in the array 23. The Q output from the Busy flip-flop is also applied to the set input of a Busy Line Latch flip-flop 96, and the Q output from the Busy Line Latch flip-flop is connected to the immediate local bus adapter's own busy line 97. Thus, once set, the Busy Line Latch flip-flop 96 holds the corresponding busy line in the busy state until the Busy Line Latch flip-flop is subsequently reset. The manner in which another local bus adapter raises the busy line 97 to set the Busy flip-flop 21 will be discussed below.

At the end of a message transmission cycle, a status check is carried out to determine the validity of the received message. If the message is unacceptable to the receiving subsystem (such as including the opcode of a command which the particular subsystem is incapable of executing), the subsystem provides a corresponding signal to the status logic 24. Similarly, if a parity error is detected by the bus control logic 6 (FIG. 1) a parity error signal is applied to the status logic 24. Thus, either type of error will be sensed by the status logic which also has the facility for determining whether the immediate error is the first which has occurred during the present cycle.

Figure 3:
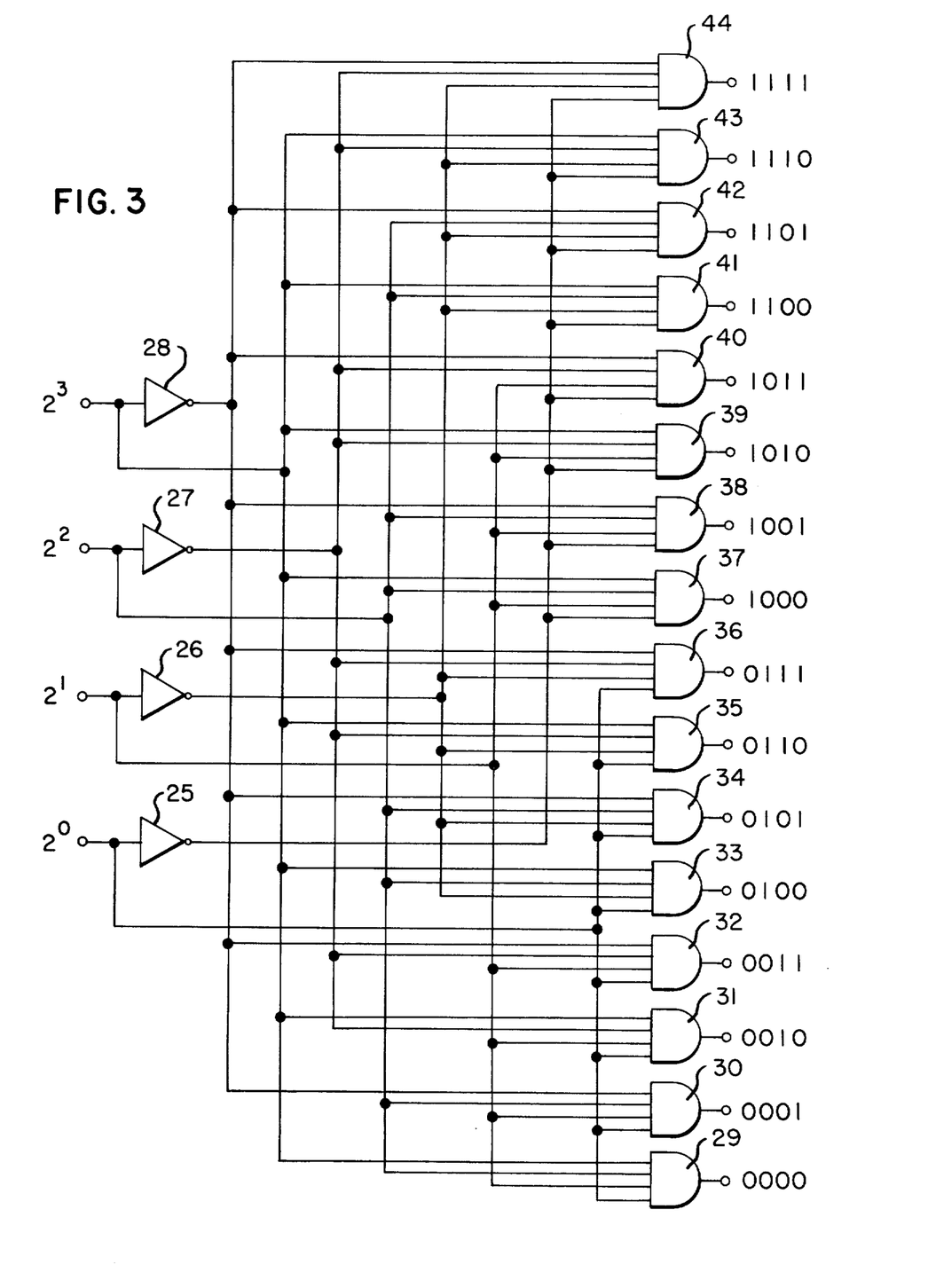
FIG. 3 is a detailed logic diagram of a one-of-sixteen decoder represented as a logic block in FIG. 2.

One-of-sixteen decoder 16 is illustrated in detail in FIG. 3. The four binary digits comprising the destination code, which digits may be designated $2^0$, $2^1$, $2^2$, and $2^3$, are each logically inverted, respectively, through inverters 25, 26, 27 and 28 to provide complements of the input signals. The input signals, and their logical inversions, are methodically applied to the AND-gates 29-44 of an output array. Thus, by way of example, if the input destination code is 1010, only the AND-gate 39 will be enabled by virtue of the logic 1 level signals appearing directly from the $2^3$ and $2^1$ inputs and the logic 1 level signals appearing at the outputs from the inverters 27 and 25 which have logically inverted the $2^2$ and $2^0$ inputs. Thus, it will be understood that, for any four digit destination code input, only a single one of the output AND-gates 29-44 will be enabled.

Figure 4A:
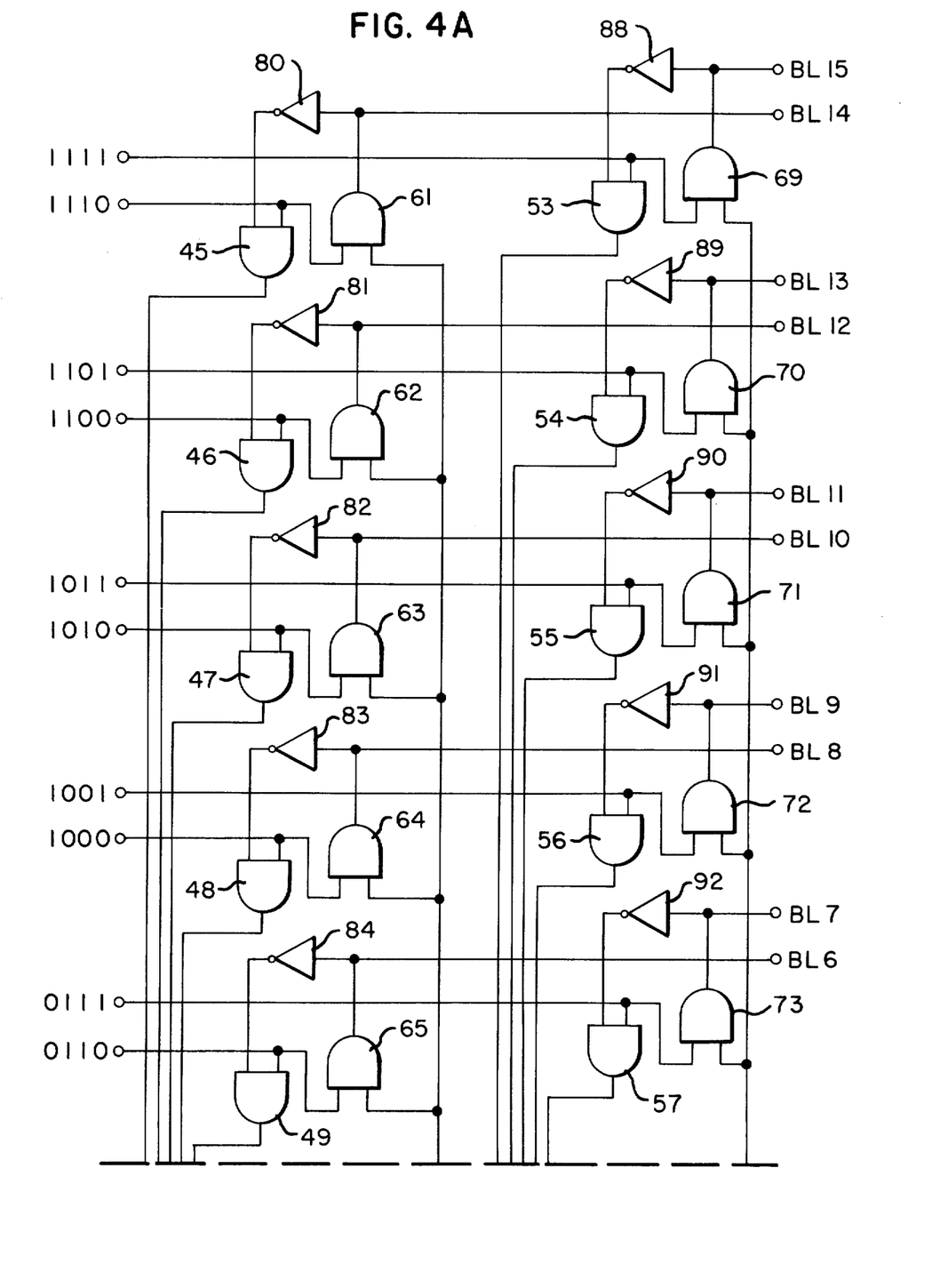
FIGS. 4A and 4B, taken together, are a detailed logic diagram of busy line selection logic represented as a logic block in FIG. 2.
Figure 4B:
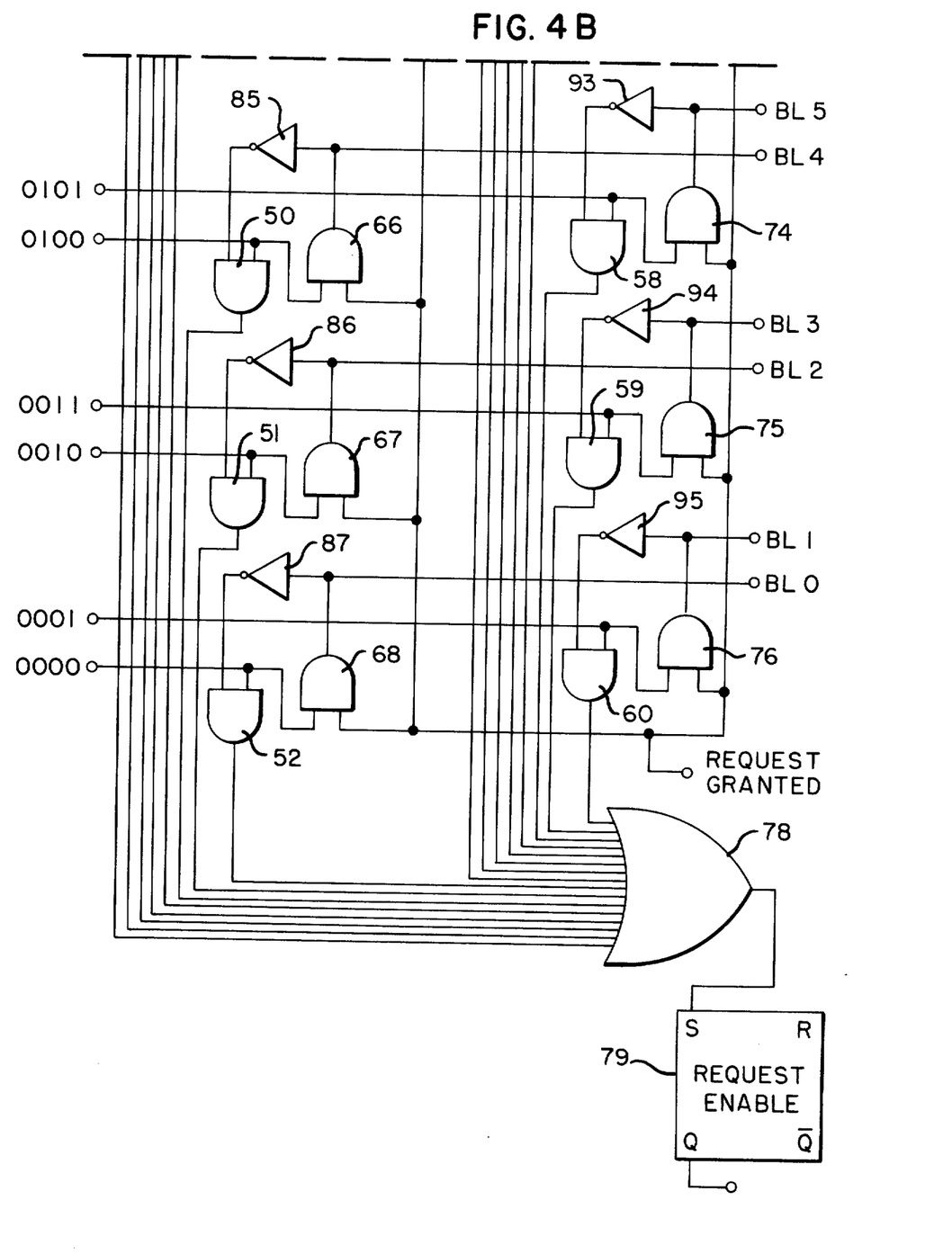

The busy line selection logic 17 of FIG. 2 may best be understood with reference to FIGS. 4A and 4B. Each of the outputs from the one-of-sixteeen decoder 16 is coupled to one input each of two AND-gates in the busy line selection logic 17. By way of example, the 1111 output from the one-of-sixteen decoder 16 is applied to single inputs of AND-gates 53 and 69. Busy line number 15 (BL15) is coupled through a logical inverter 88 to the remaining input of AND-gate 53 and itself is directly driven by the output from AND-gate 69. The other input to AND-gate 69 is connected to the Q output from the Request Granted flip-flop 15, FIG. 2, and is therefore controlled by the state thereof. The output from the AND-gate 53 is coupled as one of the sixteen inputs to an OR-gate 78. Similarly, each of the remaining inputs from the one-of-sixteen decoder 16 drives one input each of a pair of AND-gates in the groups 45-60 and 61-76. The output of each of the AND-gates 61-76 is coupled to a corresponding one of the busy lines, and the outputs from the AND-gates 45-60 are connected directly as separate inputs to OR-gate 78. It will be noted that the output from the OR-gate 78 drives the set input of a request enable flip-flop 79. The Q output from the Request Enable flip-flop 79 is connected to one input to AND-gate 20 as shown in FIG. 2.

Figure 5A:
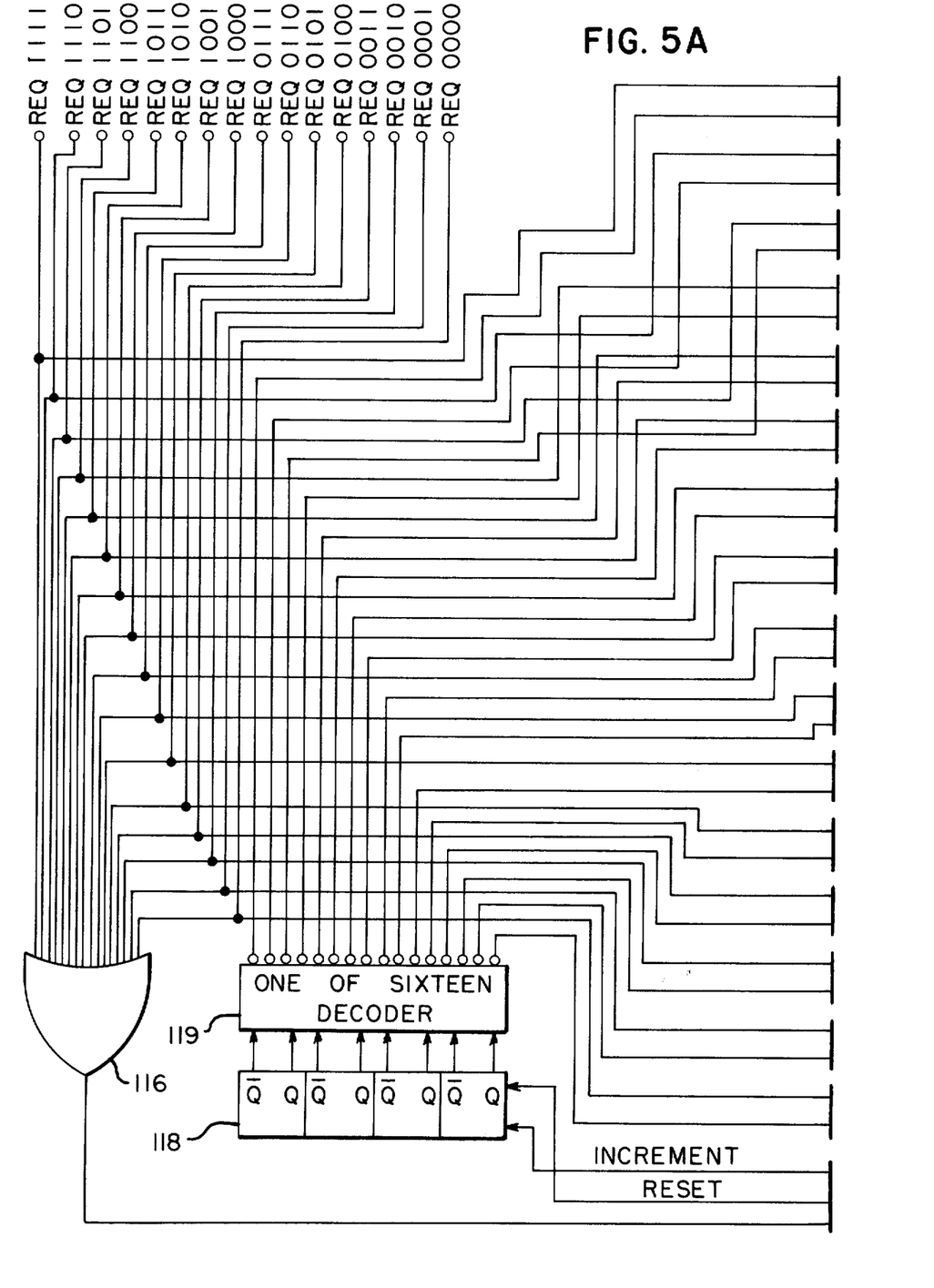
FIGS. 5A and 5B, taken together, are a logic diagram of priority determination selection logic which is contained within the bus control major logic block of FIG. 1.
Figure 5B:
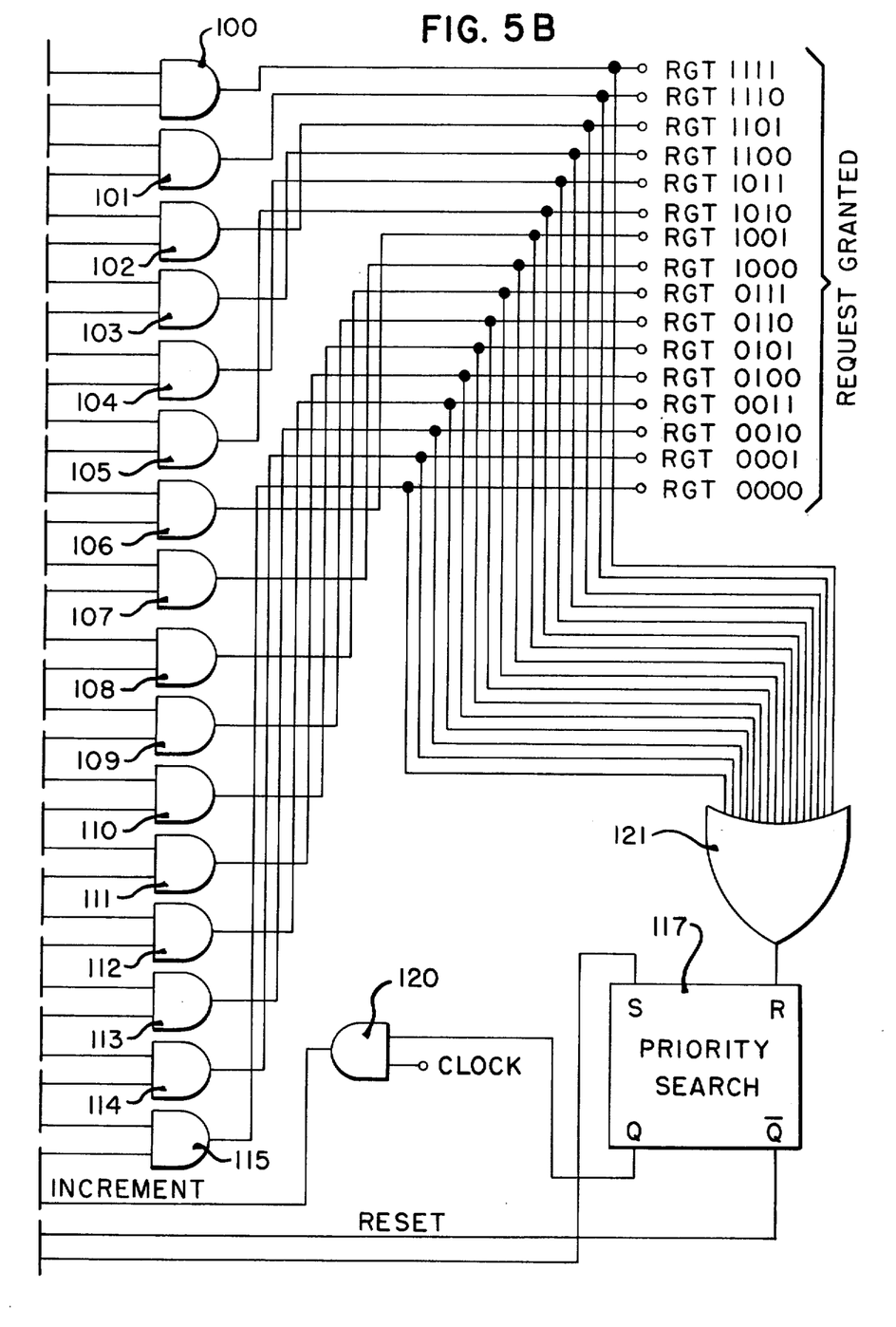

The priority selection means is included within the bus control logic 6 as shown in FIG. 1. Referring now to FIGS. 5A and 5B, exemplary priority determination logic will be discussed. Each of the sixteen individual request lines enters the priority selection logic and is connected to a first input of a single one of the AND-gates 100-115. Additionally, each request input is also connected as one input to an OR-gate 116 which has its output connected to the set input of a Priority Search flip-flop 117. Thus, any priority request will trigger the flip-flop 117 to the set state.

A four stage counter 118 has Q and $\overline{Q}$ outputs from each stage connected to a one-of-sixteen decoder 119. The one-of-sixteen decoder 119 may have essentially the same configuration as one-of-sixteen decoder 16 shown in detail in FIG. 3 with the exception that the decoder 19 also has an inverter stage disposed at each output. The output signals from one-of-sixteen decoder 119 are methodically coupled to the remaining inputs to the AND-gates 110-115 such that a single AND-gate from the array will be enabled according to the state of the four stage counter 118 and a given corresponding request both being present simultaneously at the inputs to the given AND-gate.

When the Priority Search flip-flop 117 is in the reset state, the logic 1 level observed at its $\overline{Q}$ output is applied to a reset input to the four stage counter 118 to reset all four stages of the counter. Since the outputs from the one-of-sixteen decoder 119 are inverted, one leg of the AND-gate 100 is enabled when the four stage counter 118 is completely reset (0000), and this status represents the highest priority which has been assigned to the REQ 1111 signal. When the Priority Search flip-flop 117 is set by an incoming request, the logic 1 appearing at its Q output enables one input to AND-gate 120, and clock pulses appearing at its other input serve to repetitively fully enable the AND-gate 120 to correspondingly increment the four stage counter 118, thereby serving to rapidly scan the request input lines by successively partially enabling gates 100-115, one at a time. Thus, the highest priority request present will be granted, and a corresponding request granted signal will be issued back to the requesting local bus adapter. Any request granted signal which occurs will enable OR-gate 121, to which all outputs from the AND-gates 100-115 are also connected, and OR-gate 121 drives the reset input to priority search flip-flop 117. When the Priority Search flip-flop 117 is reset, the 1 logic level appearing at its $\overline{Q}$ output will serve to again reset the four stage counter 118 in preparation for beginning a succeeding request cycle at the highest priority level.

Figure 6:
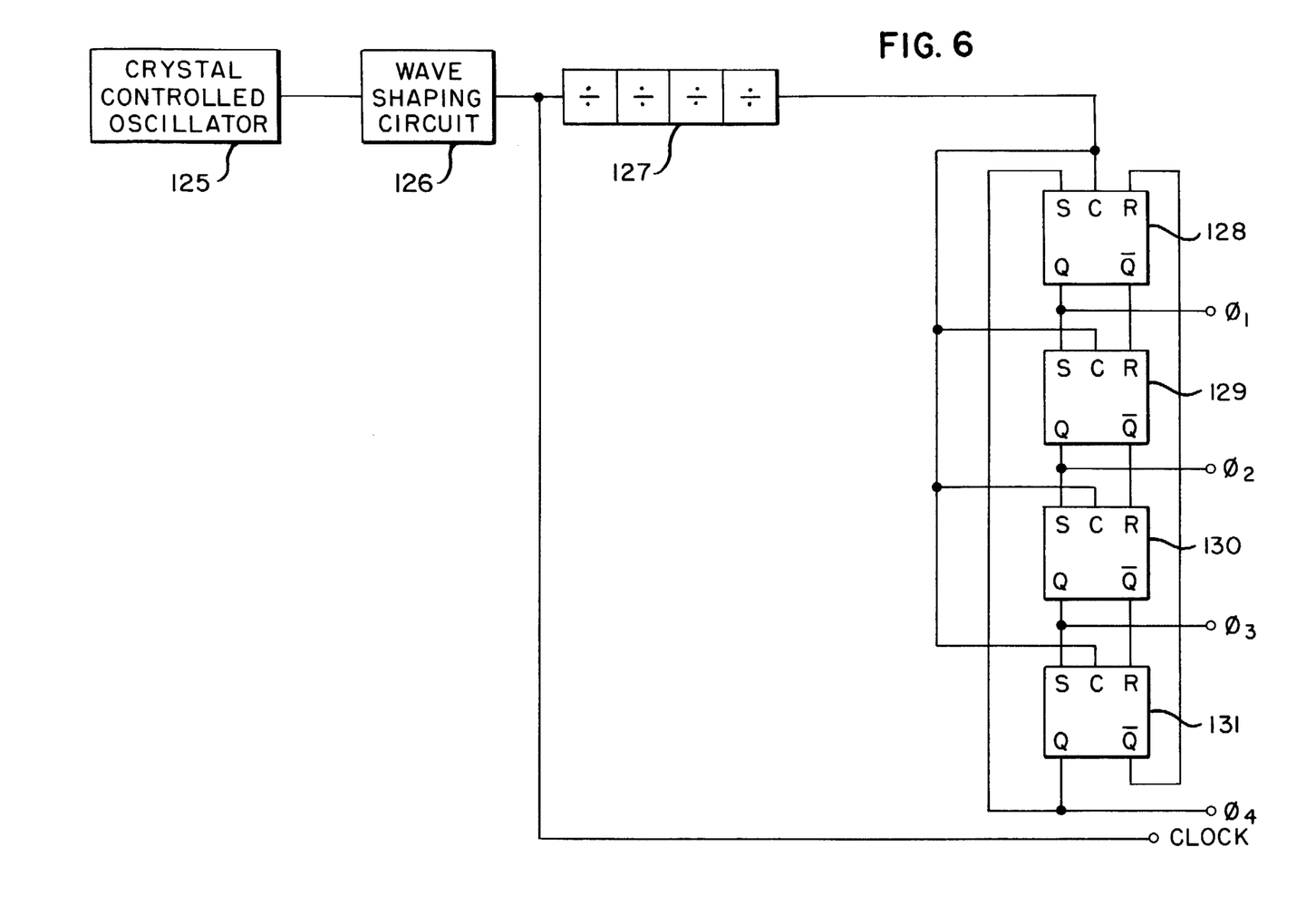
FIG. 6 illustrates simple clock and timing pulse derivation logic by which the signals necessary to coordinate the orderly sequential operation of the system are obtained.

FIG. 6 illustrates a straightforward clock and timing pulse logic circuit suitable for coordinating the apparatus of FIGS. 1-5 in accordance with the sequential event mode selected for explaining the apparatus and its operation. The output signal from a crystal oscillator 125 is passed through a wave shaping circuit 126 which may be a Schmitt trigger or the like. The output signal from the ware shaping circuit 126 is therefore a rectangular wave which is designated the clock signal. The clock signal is also applied to a frequency divider circuit 127 which may be, by way of example, four flip-flops conventionally connected to effect a frequency division of 16. The output signal from the frequency divider 127 is applied to all the clock inputs of cascaded flip-flops 128-131. The cascaded flip-flops 128-131 may be deemed a circularly configured shift register in which a single one-bit (introduced into the first stage upon initialization by means not shown) is passed from stage to stage. When each stage contains the one-bit, a 1 logic level appears at its Q output. Thus, as the circulating one-bit passes from stage to stage, pulses become successively available to coordinate events within the apparatus. These pulses are designated $\theta_1$, $\theta_2$, $\theta_3$, and $\theta_4$.

DETAILED DESCRIPTION OF THE OPERATION

Figure 7:
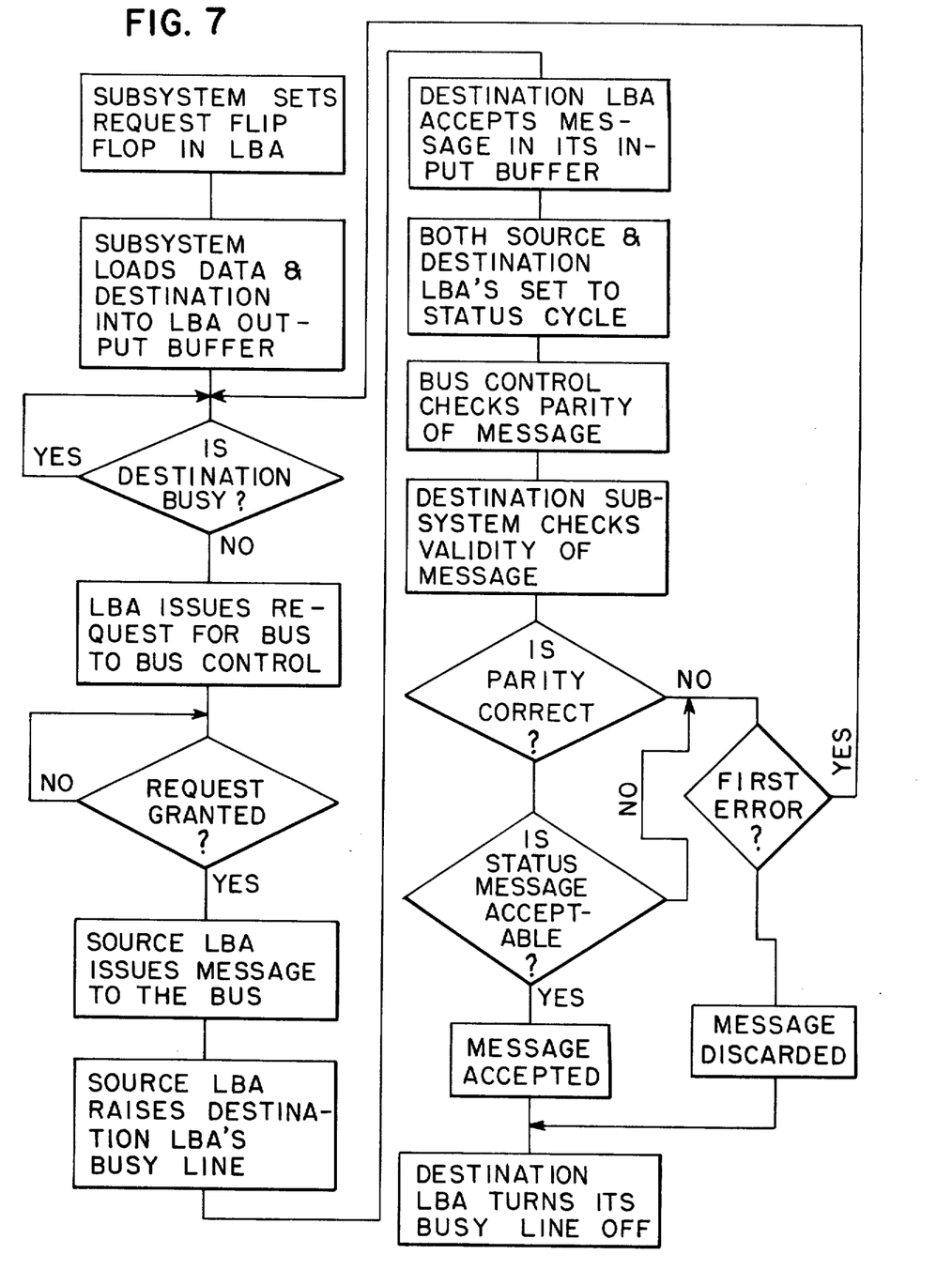
FIG. 7 is an event sequence flow diagram which illustrates the operation and interaction of the various system constituents by which information transfer is carried out according to our invention.

As previously noted, the operation of the exemplary apparatus is best understood by considering the system to operate purely sequentially. FIG. 7 is an event flow diagram illustrating the major events which take place during information transfer in accordance with the invention. Thus, FIG. 7 may be referred to in conjunction with the other Figures as the description of the system operation proceeds. Referring briefly again to FIG. 1, let it be assumed that Subsystem A wishes to transfer a message to Subsystem B. As shown in FIG. 2A, the source subsystem issues a Request signal which fully enables AND-gate 98 at $\theta_1$. AND-gate 98 therefore sets the Request flip-flop 19 and, as shown in FIG. 2B, also clocks the data and destination code into the local bus adapter output buffer 13. It may again be noted that the subsystem's ability to issue signals such as the Request signal is notoriously well known in the prior art and is not germane to the present invention.

The source local bus adapter must now determine whether the destination subsystem is available to receive the proffered message. The destination code is decoded in the one-of-sixteen decoder 16 as previously described and best shown in FIG. 3. As a result, a single one of the AND-gates 29–44 is enabled, and a corresponding signal is impressed on one leg each of a pair of AND-gates in the busy line selection logic 17 as best shown in FIGS. 4A and 4B. By way of example, it may be assumed that the destination code, which is deemed subsystem B's address, is 1010. The AND-gate 39, FIG. 3, in the one-of-sixteen decoder 16 will become enabled by this address, and its output signal is impressed on one input each of AND-gates 47 and 63 of the busy line logic 17 as shown in FIG. 4A. If BL11 is available, i.e., not busy, it will be at the 0 logic level. This 0 logic level is inverted through the inverter 82, and a 1 logic level is therefore applied to the other input to AND-gate 47. AND-gate 47, thus fully enabled, issues a 1 logic level which is applied to and enables OR-gate 78, FIG. 4B. When OR-gate 78 is enabled, its output signal drives the set input to Request Enable flip-flop 79 which is therefore forced to the set state. When the Request Enable flip-flop 79 is set, the 1 logic level appearing at its Q output fully enables the AND-gate 20, shown in FIG. 2A, whereby the source local bus adapter issues a request for access to the bus.

This priority request signal appears as an input to the priority search apparatus in the bus control logic as shown in FIG. 5A. Assume for simplicity that the local bus adapters have priority in accordance with their binary identification numbers and further assume that the requesting source local bus adapter is designated 1000. Therefore, the REQ 1000 signal will partially enable AND-gate 107 and will fully enable OR-gate 116 as shown in FIG. 5B. The output from OR-gate 116 drives the set input to Priority Search flip-flop 117 which will therefore assume the set state. The resulting 1 logic level appearing at its Q output is applied to a first input to AND-gate 120. The second input to AND-gate 120 is driven by the clock signal, FIG. 6, such that AND-gate 120 is repetitively enabled at the clock frequency to increment the four bit counter 118, FIG. 5A. The four bit counter 118, as previously noted, starts from the count of 0000 since it would have been reset after the most recent previous priority search.

As the four bit counter 118 is incremented, the respective first inputs to the AND-gates 110–115 driven from the one-of-sixteen decoder 119 are successively enabled. If no higher priority request is present by the time one-of-sixteen decoder 119 issues a partially enabling signal to the AND-gate 107, the AND-gate 107 will become fully enabled to honor the request by the source local bus adapter having the designation 1000. AND-gate 107 therefore issues a request granted signal back to that specific source local bus adapter. The request granted signal also enables an OR-gate 121 which drives the reset input to Priority Search flip-flop 117. When the Priority Search flip-flop 117 is reset, the AND-gate 120 is disabled such that the four stage counter 118 can no longer be incremented. Simultaneously, the 1 logic level appearing at the $\overline{Q}$ output of the Priority Search flip-flop 117 is utilized to reset the four stage counter 118 back to 0000 in anticipation of a subsequent priority request cycle.

Referring again to FIG. 2B, the request granted signal is received by the source local bus adapter where it is applied to the set input of Request Granted flip-flop 15. When the Request Granted flip-flop 15 is set, the 1 logic level appearing at its Q output is applied to the control inputs to the gates in the output gate array 14 whereby the data and destination information is placed onto the bus. Simultaneously, as best shown in FIG. 4B, the 1 logic level from the Q output of the Request Granted flip-flop is also applied to one input each of the AND-gates 61–76. Of the AND-gates in this group, only AND-gate 63 has its other input at the 1 logic level by virtue of the 1010 signal received from one-of-sixteen decoder 16. Thus, AND-gate 63 is fully enabled to place a 1 logic level onto BL11.

Referring again to FIG. 2, let it now be assumed that the local bus adapter shown is the destination. The destination local bus adapter's own busy line 97, driven to the 1 logic level by the AND-gate 63, FIG. 4A, from the source local bus adapter will set the Busy flip-flop 21. The resulting 1 logic level appearing at the Q output from the busy flip-flop 21 will set the Busy Latch flip-flop 96 and will also enable the AND-gate array 23 and partially enable the AND-gate 99. When the Busy Latch flip-flop 96 assumes the set state, its Q output holds the local busy line 97 in the busy condition. Data placed on the bus from the source local bus adapter passes through the AND-gate array 23 and is clocked into the input buffer 22 and thence to the subsystem interface 11 when the $\theta_3$ signal fully enables AND-gate 99.

The information transfer is completed by carrying out routine housekeeping tasks. The subsystem performs the usual check of the received information to determine its apparent validity. For example, the subsystem will check to determine if the operation code included with the information received is the type of command to which it can respond. According to the apparent validity of the message received by the subsystem, a status message is issued to the status information logic 24 from the subsystem interface 11.

During the time the message is on the bus, the bus control logic checks the message parity. If the message as received by the subsystem is apparently valid, and there is no parity error, the message transfer is deemed complete, and the Busy flip-flop 21 and the Busy Latch flip-flop 96 in the destination local bus adapter and the Request Enable flip-flop 79 and the Request Granted flip-flop 15 in the source local bus adapter are reset by $\theta_4$ in preparation for a completely new transfer within the system.

As indicated in FIG. 7, if an error has occurred and it is the first error associated with the particular message transfer underway, the source local bus adapter again issues a request for the bus to the bus control and, when the request is granted, another attempt is made to carry out the message transfer. If the message transfer fails again on the second try, the destination local bus adapter disregards the message and turns its busy line off. No detailed apparatus is disclosed for carrying out these routine housekeeping tasks which are not germane to the present invention.

Thus, while the principles of the invention have now been made clear in an illustrative embodiment, there will be immediately obvious to those skilled in the art many modifications of structure, arrangement, proportions, elements, and components used in the practice of the invention which are particularly adapted for specific environments and operating requirements without departing from those principles.

What is claimed is:

1. In a data processing system which includes a plurality of data processors adapted to communicate with one another, each such data processing including means for issuing a request signal, a destination signal, and data to be transferred to another data processor, apparatus for establishing a data transmission path between an originating data processor and a destination data processor comprising:
   a. a common bus;
   b. a plurality of local bus adapters corresponding in number to said plurality of data processors, each local bus adapter operatively connected between a respective one of the data processors and the said common bus, each of said local bus adapters including:
      1. busy indicator means having first and second states, said first state providing an indication that a data processor coupled to the local bus adapter is busy;
      2. means for individually setting its own said busy indicator means and any one of the other of said local bus adapters coupled to said common bus to said first state; and
      3. means responsive to said first state of the indicator means included therewith for accepting data from said common bus.

2. A data processing system in accordance with claim 1 and which further includes priority selection means for arbitrating simultaneous or nearly simultaneous requests by originating local bus adapters for use of said common bus by issuing a granted bus request signal only to the selected local bus adapter, each of said local bus adapters further including:
   a. means responsive to the reception of a request signal and a destination code from the originating data processing and to a sensed second state of said busy indicator means in the designated destination local bus adapter, which second state indicates that the data processor operatively connected to said destination local bus adapter is not in the busy state, for issuing a request for access to said common bus to the priority selection means; and
   b. means responsive to a granted bus request signal for transferring data to said common bus.

3. A data processing system in accordance with claim 2 in which each of said local bus adapters further includes means responsive to said second state of said busy indicator means included therewith for transferring data from said common bus to the data processor connected to said local bus adapter.

4. The data processing system of claim 3 in which said busy indicator means comprises a first bistable logic element having a set input and an output providing a logic level indication of the state thereof.

5. The data processing system of claim 4 in which said busy indicator means further includes:
   A. a second bistable logic element having a set input and an output providing a logic level indication of the state thereof;
   B. means coupling said output at said first bistable logic element to said set input of said second bistable logic element;
   C. a busy line;
   D. means coupling said busy line to said set input of said first bistable logic element; and
   E. means coupling said busy line to said output of said second bistable logic element.

6. The data processing system of claim 5 in which each local bus adapter further includes:
   A. decoder means adapted to receive the destination code from the data processor coupled to said local bus adapter and to issue a unique signal identifying a prospective destination local bus adapter in accordance with the destination code; and
   B. busy line select logic responsive to the combination of:
      1. said unique signal;
      2. a sensed second state of said busy indicator means in the one of said local bus adapters identified by said unique signal; and
      3. a granted bus request signal; for applying a set signal to the busy line of the one of said local bus adapters identified by said unique signal whereby said first bistable logic element in the said one local bus adapter identified by said unique signal is set to said first state.

7. The data processing system of claim 6 in which said busy line select logic includes means for logically combining said unique signal and the logic level appearing on the one said busy line of the one said local bus adapter identified by said unique signal when said first bistable logic element therein is in said first state and for issuing a request signal to the priority selection means when the logical combination is true.

8. In a data processing system apparatus for establishing a data transmission path between an originating data processor and a destination data processor comprising:
   A. a common bus;
   B. a first local bus adapter operatively connected between the originating data processor and said common bus;
   C. a second local bus adapter operatively connected between the destination data processor and said common bus;
   D. each of said first and second local bus adapters including:
      1. busy indicator means having first and second states, said first state providing an indication that the data processor coupled to said local bus adapter is busy;
      2. means for setting said busy indicator means of both of said local bus adapters to said first state; and
      3. means responsive to said first state of the other said busy indicator means included therewith for accepting data from said common bus.

* * * * *